United States Patent
Adkins

(10) Patent No.: US 7,776,969 B2
(45) Date of Patent: *Aug. 17, 2010

(54) ALLOPHANATE-MODIFIED STABILIZERS AND THE POLYMER POLYOLS PREPARED FROM THESE STABILIZERS

(75) Inventor: Rick L. Adkins, Hurricane, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/633,401

(22) Filed: Dec. 4, 2006

(65) Prior Publication Data

US 2008/0132662 A1 Jun. 5, 2008

(51) Int. Cl.
C08F 4/00 (2006.01)
C08F 2/00 (2006.01)
C08J 9/00 (2006.01)

(52) U.S. Cl. .................. 525/263; 526/222; 526/223; 526/225; 521/50

(58) Field of Classification Search ............ 525/263; 526/222, 223, 225; 521/50
See application file for complete search history.

(56) References Cited

U.S. PATENT DOCUMENTS

| | | | |
|---|---|---|---|
| 4,723,026 A | 2/1988 | Cloetens et al. | 556/444 |
| 4,831,076 A | 5/1989 | Lidy et al. | 524/701 |
| 4,883,832 A | 11/1989 | Cloetens et al. | 524/265 |
| 5,196,476 A | 3/1993 | Simroth | 524/769 |
| 5,319,053 A | 6/1994 | Slack et al. | 528/48 |
| 5,319,054 A * | 6/1994 | Slack et al. | 528/48 |
| 5,440,003 A | 8/1995 | Slack | 528/48 |
| 5,567,793 A | 10/1996 | Slack et al. | 528/69 |
| 5,663,272 A | 9/1997 | Slack et al. | 528/69 |
| 5,686,042 A | 11/1997 | Slack et al. | 264/328.6 |
| 5,821,275 A | 10/1998 | Madan et al. | 521/159 |
| 5,854,386 A | 12/1998 | Shen et al. | 528/403 |
| 5,874,485 A | 2/1999 | Milliren | 521/160 |
| 5,990,185 A | 11/1999 | Fogg | 521/112 |
| 6,013,731 A | 1/2000 | Holeschovsky et al. | 525/123 |
| 6,172,164 B1 * | 1/2001 | Davis et al. | 525/263 |
| 6,271,279 B1 | 8/2001 | Nodelman et al. | 521/159 |
| 6,617,413 B1 | 9/2003 | Bruchmann et al. | |
| 2006/0052527 A1 | 3/2006 | Weikard et al. | |

FOREIGN PATENT DOCUMENTS

| | | |
|---|---|---|
| EP | 786 480 B1 | 7/2003 |
| WO | 2006069690 A | 7/2006 |
| WO | 2008043722 A | 4/2008 |

* cited by examiner

*Primary Examiner*—William K Cheung
(74) *Attorney, Agent, or Firm*—N. Denise Brown; Noland J. Cheung

(57) ABSTRACT

This invention relates to novel ethylenically unsaturated macromers, preformed stabilizers prepared from these novel macromers, polymer polyols prepared from either the novel ethylenically unsaturated macromers or the preformed stabilizers, and to processes for the preparation of these compositions.

24 Claims, No Drawings

ALLOPHANATE-MODIFIED STABILIZERS AND THE POLYMER POLYOLS PREPARED FROM THESE STABILIZERS

BACKGROUND OF THE INVENTION

This invention relates to ethylenically unsaturated macromers prepared from allophanate-modified isocyanates which contain reactive unsaturation, pre-formed stabilizers prepared from these novel ethylenic unsaturated macromers, polymer polyols prepared from the macromers and the pre-formed stabilizers, and processes for the preparation of these compositions.

Allophanate-modified diphenylmethane diisocyanates and prepolymers thereof are known and described in, for example, U.S. Pat. Nos. 5,319,053, 5,319,054, 5,440,003, 5,663,272 and 5,686,042. U.S. Pat. No. 5,319,053 discloses a process for preparing stable liquid allophanate-modified MDI isocyanates and prepolymers of these allophanate-modified MDI isocyanates. This process comprises reacting a specific MDI isomer composition with an aliphatic alcohol containing between 1 and 36 carbon atoms to give an allophanate-modified MDI having an NCO group content of 12 to 32.5%.

Various allophanate-modified MDI's, prepolymers and other modifications thereof, and processes for their preparation, and which can be used in various end uses such as, for example, footwear and flexible foams, as is known and described in, for example, U.S. Pat. Nos. 5,567,793, 5,663, 272, 5,686,042, 5,821,275, 5,874,485 and 6,271,279 and in EP 641,812.

A number of methods for inducing reactive unsaturation into a polyol, thereby forming a macromer, are known in the art. U.S. Pat. No. 6,013,731 teaches several techniques, including reaction of a polyol with unsaturated isocyanates (such as isocyanatoethylmethacrylate (IEM) or α,α-dimethyl metaisopropenyl benzylisocyanate (i.e. TMI)), or reaction of a polyol with maleic acid or maleic anhydride, followed by isomerization of the maleate bond to the more reactive fumarate bond. A macromer prepared by transesterification of a vinylalkoxy silane with a polyol has been disclosed in EP 0,162,589.

A pre-formed stabilizer is defined as an intermediate obtained by reacting a macromer containing reactive unsaturation (e.g. acrylate, methacrylate, maleate, etc.) with monomers (e.g. acrylonitrile, styrene, methyl methacrylate, etc.), optionally in a diluent or a solvent (e.g. methanol, isopropanol, toluene, ethylbenzene, polyether polyols, etc.) to give a co-polymer (dispersion having e.g. a low solids content (e.g. <20%), or soluble grafts, etc.).

A pre-formed stabilizer (PFS) is particularly useful for preparing a polymer polyol having a lower viscosity at a high solids content. In the pre-formed stabilizer processes, a macromer is reacted with monomers to form a co-polymer composed of macromer and monomers. These co-polymers comprising a macromer and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

Pre-formed stabilizers of U.S. Pat. No. 5,196,476 are prepared by polymerizing a macromer and one or more ethylenically unsaturated monomers in the presence of a free-radical polymerization initiator and a liquid diluent in which the pre-formed stabilizer is essentially insoluble. EP 0,786, 480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromer, at least one ethylenically unsaturated monomer, and a free radical polymerization initiator.

Large, bulky molecules are known to be effective macromers because less material can be used to sterically stabilize the particles. See, for example, EP 0786480. Generally, this is due to the fact that a highly branched polymer has a considerably larger excluded volume than a linear molecule (such as, e.g., a monol), and therefore less of the branched polymer is required. U.S. Pat. No. 5,196,476 discloses that functionalities of 2 and higher, and preferably 3 and higher, are suitable to prepare macromers. EP 0,162,589 and U.S. Pat. No. 5,990,185 describe a macromer, and polymer polyols prepared therefrom, wherein the macromer is prepared by transesterification of a vinyl alkoxysilane with a polyol. Coupling multi-functional polyols with polyisocyanates is also known and described in the field of polymer polyols as a suitable means to increase the molecular weight of the macromer. EP 0786480 discloses a process for preparation of a pre-formed stabilizer wherein the liquid polyol comprises at least 30% coupled polyol. As described therein, a high concentration of coupled polyol is useful for obtaining particles with a small particle size in the pre-formed stabilizer (PFS) and the induction of reactive unsaturation into a coupled polyol is a useful means for incorporating coupled polyol into the particles. U.S. Pat. No. 6,013,731 describes enhancing the stability of the dispersion by coupling high molecular weight polyols to form an even higher molecular weight product. Macromers prepared from polyols with low intrinsic unsaturation (<0.020 meq/gram) are also described therein. This patent further discloses that such polyols have a low concentration of oxyalkylated, allylic unsaturation-containing monols, and are therefore advantageous because the high concentration of monols present in conventional polyols lowers the average functionality of the polyol.

Macromers based on multi-functional polyols and which have multiple sites of reactive unsaturation are described in U.S. Pat. No. 5,196,476. As described therein, there is an upper limit to the concentration of unsaturation when making macromers by the maleic anhydride route. If the ratio of moles of unsaturation per mole of polyol is too high, then there is a higher probability that species will be formed which have more than one double bond per molecule. Typically, the '476 patent employs from about 0.5 to about 1.5 moles, and preferably from about 0.7 to about 1.1 moles, of the reactive unsaturated compound for each mole of the alkoxylated polyol adduct.

U.S. Pat. No. 5,854,386 discloses stabilizers for polymer polyols which contain both hydroxyl-functionality and unsaturation-functionality. These are prepared by oxyalkylating an unsaturated monomer having at least one oxyalkylatable hydrogen in the presence of an effective amount of a DMC catalyst, and optionally, in the presence of a free-radical polymerization inhibitor. These stabilizers preferably correspond to mixtures containing one or more of the two formulae:

R[—(—R$^2$—O—)$_n$H]$_o$ or R—(—X—{—(R$^2$—O)$_n$—H}$_m$)$_o$ wherein: o is an integer between 1 and 8; n is an integer whose average value is such that the product n·o is from 10 to 500; R$^2$ is alkylene or substituted alkylene; X is a linking group; and R is a C$_{2\text{-}30}$ hydrocarbon containing at least one site of ethylenic or ethylynic (acetylenic) unsaturation, optionally substituted by non-reactive groups and optionally containing interspersed heteroatoms. R may be aliphatic, cycloaliphatic, aromatic, arylaliphatic, heteroaromatic, etc. with the proviso that when R is aromatic or heteroaromatic, the aromatic ring structure is substituted by at least one ethylenic or ethylynic radical-containing group.

There is a continuing need for novel macromers and novel preformed stabilizers to further advance the properties and characteristics of polymer polyols prepared from these macromers and preformed stabilizers. Although numerous macromers and preformed stabilizers are known, these have not previously been prepared from allophanate-modified diisocyanates which contain ethylenic unsaturation.

SUMMARY OF THE INVENTION

This invention relates to ethylenically unsaturated macromers which comprise the reaction product of (a) an allophanate-modified diisocyanate having an NCO group content of about 9% to about 48% which contains ethylenic unsaturation, with (b) a polyether polyol having an OH number of 10 to 300 and a functionality of 2 to 15, optionally, in the presence of (c) one or more urethane catalysts. The allophanate-modified diisocyanate comprises the reaction product of (1) a diisocyanate, and (2) at least one ethylenically unsaturated alcohol compound, in the presence of (3) at least one radical inhibitor which is free of NCO-reactive groups, and (4) at least one allophanate catalyst.

The present invention also relates to preformed stabilizers which comprise the free-radical polymerization product of (A) these novel ethylenically unsaturated macromers described herein, with (B) at least one ethylenically unsaturated monomer, in the presence of (C) at least one free-radical polymerization initiator, and, optionally, (D) a liquid diluent, and, optionally, (E) a chain transfer agent.

This invention is also directed to polymer polyols which comprise the reaction product of (I) a base polyol having a hydroxyl number of from about 10 to about 1900, a functionality of about 1 to about 10, and an equivalent weight of about 30 to about 900, (II) the novel ethylenically unsaturated macromers described herein or the preformed stabilizer prepared from these ethylenically unsaturated macromers, and (III) at least one ethylenically unsaturated monomer, in the presence of (IV) at least one free-radical polymerization initiator, and, optionally, (V) a chain transfer agent.

The present invention also relates to processes for the preparation of these novel ethylenically unsaturated macromers, preformed stabilizers and polymer polyols. Another aspect of the present invention relates to foams prepared from these polymer polyols, and to a process for making these foams.

DETAILED DESCRIPTION OF THE INVENTION

The ethylenically unsaturated macromers of the invention include those compounds which comprise the reaction product of (a) liquid, storage stable, allophanate-modified diisocyanates which are typically characterized by an NCO group content of at least about 9% NCO, and preferably of at least about 13% NCO, and more preferably of at least about 16% NCO. These liquid allophanate-modified diisocyanates are also typically characterized by an NCO group content or less than or equal to about 48% NCO, preferably less than or equal to about 38% NCO and more preferably less than or equal to about 29% NCO. The liquid modified diisocyanates may also have an NCO group content ranging between any combination of these upper and lower values, inclusive. For example, the liquid diisocyanates may have an NCO group content of from about 9% by weight NCO to about 48% by weight NCO, preferably from about 13% by weight NCO to about 38% by weight NCO and more preferably from about 16% by weight NCO to about 29% by weight NCO.

In accordance with the present invention, suitable diisocyanates to be used as component (1) in the allophanate-modified diisocyanates (a) of the invention include, for example, the known monomeric diisocyanates and polyisocyanates. The various monomeric diisocyanates may be represented by the formula R(NCO)$_2$ in which R represents an organic group obtained by removing the isocyanate groups from an organic diisocyanate having a molecular weight of about 56 to 1,000, preferably about 76 to 400. Diisocyanates preferred for the process according to the invention are those represented by the above formula in which R represents a divalent aliphatic, hydrocarbon group having 4 to 12 carbon atoms, a divalent cycloaliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl)methane, 2,4'-dicyclohexylmethane diisocyanate, 1,3- and 1,4-bis(isocyanatomethyl)cyclohexane, bis(4-isocyanato-3-methyl-cyclohexyl)methane, α,α,α', α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,2'-, 2,4'- and/or 4,4'-diphenylmethane diisocyanate, 1,5-diisocyanato naphthalene and mixtures thereof. Aromatic polyisocyanates containing 3 or more isocyanate groups such as 4,4',4''-triphenylmethane triisocyanate and polymethylene poly(phenylisocyanates) obtained by phosgenating aniline/formaldehyde condensates may also be used.

Suitable di- and/or polyisocyanates to be in accordance with the present invention typically have NCO group contents from about 25 to about 60%. These di- and/or polyisocyanates typically have NCO group contents of at least about 25%, preferably at least about 30% and most preferably at least about 31%. The polyisocyanates suitable herein also typically have NCO group contents of less than or equal to 60%, preferably of less than or equal to 40% and most preferably of less than or equal to 34%. The polyisocyanates may have an NCO group content ranging between any combination of these upper and lower values, inclusive, e.g., from 25 to 60%, preferably from 30 to 40% and most preferably from 31 to 34%.

Preferred diisocyanates to be used in accordance with the present invention include those based on aromatic diisocyanates such as, for example, 1,3- and/or 1,4-phenylene diisocyanate, 2,4- and/or 2,6-toluene diisocyanate, 2,2'-, 2,4'- and/or 4,4'-diphenylmethane diisocyanate, 1,5-diisocyanato naphthalene and mixtures thereof. Of these, it is more preferred to use 2,4- and/or 2,6-toluene diisocyanate, or 2,2'-, 2,4'- and/or 4,4'-diphenylmethane diisocyanate.

A preferred diisocyanate to be used as component (1) in preparing the allophanate-modified diisocyanates suitable as component comprises diphenylmethane diisocyanate in which the 2,2'-isomer is present in an amount of from 0 to 6% by weight, preferably 0 to 3% by weight, and more preferably 0 to 1% by weight; the 2,4'-isomer is present in an amount of 0 to 76% by weight, preferably 0 to 17% by weight, and more preferably 0 to 5% by weight; and the 4,4'-isomer is present in an amount of from 24 to 100% by weight, preferably 80 to 100% by weight, and more preferably 94 to 100% by weight. When mixtures of the 2,2'-isomer, the 2,4'-isomer and the 4,4'-isomer of diphenylmethane diisocyanate are used, the sum of the %'s by weight of the individual isomers totals 100% by weight of the diphenylmethane diisocyanate.

Suitable ethylenically unsaturated alcohols to be used as component (2) in the allophanate-modified diisocyanates of the present invention include, for example, compounds which contain at least one, and preferably only one $\alpha,\beta$-ethylenically unsaturated group and one hydroxyl group. Suitable compounds to be used as the ethylenically unsaturated alcohols include those such as, for example, hydroxyalkyl acrylates, hydroxyalkyl methacrylates, hydroxyalkoxy acrylates, hydroxyalkoxy methacrylates, hydroxyaryl acrylates, hydroxyaryl methacrylates, aromatically-substituted ethylenically unsaturated monols, isopropenyl-phenyl monols, hydroxyl nitriles, etc. Some specific examples of such compounds for component (2) herein include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxypentyl acrylate, 2-hydroxypentyl methacrylate, 2-hydroxyhexyl acrylate, 2-hydroxyhexyl methacrylate, 2-hydroxyoctyl acrylate, 2-hydroxyoctyl methacrylate, diethylene glycol monoacrylate, diethylene glycol monomethacrylate, dipropylene glycol monoacrylate, dipropylene glycol monomethacrylate, 4-hydroxyphenyl acrylate, 4-hydroxyphenyl methacrylate, 2-hydroxyphenyl acrylate, 2-hydroxyphenyl methacrylate, 3-hydroxyphenyl acrylate, 3-hydroxyphenyl methacrylate, cinnamyl alcohol, isopropenylphenol, isopropenylbenzyl alcohol, $\alpha,\alpha$-dimethyl-m-iso-propenylbenzyl alcohols, 4-hydroxycrotononitrile, etc. It is preferred that these ethylenically unsaturated alcohols have a molecular weight (number average) of from about 69 to about 1500. Preferred ethylenically unsaturated alcohols to be used as component (2) herein are 2-hydroxyethyl methacrylate, 2-hydroxylethyl acrylate, 2-hydroxylpropyl methacrylate, and cinnamyl alcohol.

Suitable compounds to be used as component (3), the radical inhibitor, in accordance with the present invention include, for example, any compound known to be capable of inhibiting the homopolymerization of compounds containing reactive unsaturation. Generally, such radical inhibitors include compounds which are free of groups that are capable of reacting with the NCO groups of the diisocyanate component. Some examples suitable radical inhibitors to be used as component (3) in the present invention include 1,4-benzoquinone, phenothiazine, etc.

Suitable allophanate catalyst to be used as component (4) in accordance with the present invention include any known catalyst which is capable of promoting the allophanate reaction between a diisocyanate component and a component which contains one alcohol group. Some examples of such allophanate catalysts include, for example, zinc salts such as zinc acetylacetonate (ZnAcAc), stannous octoate, zinc octoate, tetraalkylammonium compounds, such as N,N,N-trimethyl-N-2-hydroxy-propylammonium hydroxide, N,N,N-trimethyl-N-2-hydroxypropyl-ammonium 2-ethylhexanoate or choline 2-ethylhexanoate, etc. A preferred catalyst is zinc acetylacetonate (ZnAcAc). Typically, the catalyst is present in an amount ranging from 25 to 200 ppm, based on the weight of (1) the isocyanate component.

The allophanate modified diisocyanates of the present invention are prepared in accordance with known processes and procedures. Such processes include, for example, those described in U.S. Pat. Nos. 5,319,053, 5,319,054, or U.S. Published Patent Applications 20060051591, 20060052526, 20060052527, the disclosures of which are hereby incorporated by reference.

Suitable catalyst stoppers to be used in the process of the present invention include compounds such as, for example, benzoyl chloride, hydrochloric acid, di(2-ethylhexyl)phosphate, etc. Benzoyl chloride is a preferred stopper. When present, the stopper is typically added in an amount that is equal to about twice the weight of the allophanate catalyst.

The allophanate-modified diisocyanates which contain ethylenic unsaturation as described herein as component (a) of the ethylenically unsaturated macromers are not the subject of the present invention. These allophanate-modified diisocyanates which are specifically prepared from diphenylmethane diisocyanate are the subject of the commonly assigned U.S. application Ser. No. 11/633,242 which was filed in the United States Patent and Trademark Office on Dec. 4, 2006.

Suitable polyether polyols for component (b) which is to be reacted with the allophanate-modified diisocyanate compounds (a) to form the ethylenically unsaturated macromers include those having a functionality of at least about 2, preferably at least about 3, and more preferably at least about 4. The functionality of suitable polyether polyols is less than or equal to about 15, preferably less than or equal to about 10, and most preferably less than or equal to about 8. The suitable polyether polyols may also have functionalities ranging between any combination of these upper and lower values, inclusive. The OH numbers of suitable polyether polyols is at least about 10, preferably at least about 15, and most preferably at least about 18. Polyether polyols typically also have OH numbers of less than or equal to about 300, preferably less than or equal to about 200, and most preferably less than or equal to about 100. The suitable polyether polyols may also have OH numbers ranging between any combination of these upper and lower values, inclusive. The (number average) molecular weights of suitable polyether polyols is typically greater than about 400, preferably at least about 2,000, and most preferably at least about 4,000. Polyether polyols typically have (number average) molecular weights of less than or equal to 15,000, more preferably less than or equal to 12,000, and most preferably less than or equal to 9,000. The suitable polyether polyols may also have (number average) molecular weights ranging between any combination of these upper and lower values, inclusive.

These polyether polyols may also have functionalities ranging from about 2 to about 15, preferably from about 3 to about 10, and most preferably from about 4 to about 8; OH numbers ranging from about 10 to 300, preferably from about 15 to about 200, and most preferably from about 18 to about 100; and (number average) molecular weights ranging from greater than 400 to about 15,000, preferably about 2,000 to 12,000, and most preferably about 4,000 to 9,000.

Examples of such polyether polyols are known and described in detail in U.S. Published Application Number 20060025558, and specifically in paragraphs [0104] through [0108] therein, the disclosure of which is hereby incorporated by reference.

The reaction between allophanate-modified diisocyantes (a) and the polyether polyols (b) is optionally in the presence of (c) one or more urethane catalysts. The presence of a catalyst is not necessary, but generally depends on composition of the diisocyanate used to prepare the allophanate-modified diisocyanates (a). Virtually any catalyst known to be suitable for promoting the urethane reaction reaction can be used as component (c) in the present invention. Examples of suitable catalysts that can be used are bismuth-containing catalysts such as COSCAT 83 available from Cosan Chemical Co., tertiary amines, such as triethylamine, dimethylethanolamine, triethylene diamine (DABCO), bicyclic amidines such as 1,8-diazabicyclo(5.4.0)undec-7-ene (DBU), as well as organometallic catalysts such as stannous octate, dibutyltin dilaurate, dibutyltin mercaptide and the like. Other suitable catalysts are disclosed in U.S. Pat. No. 5,233,009, the disclosure of which is hereby incorporated by reference.

In the process for preparing the ethylenically unsaturated macromer, the allophanate-modified diisocyanate component (a) is typically reacted with the polyether polyol (b) at temperatures of about 25 to about 150° C. for time periods of from about 1 to about 10 hours, optionally, in the presence of a urethane catalyst. It is preferred that this reaction is at temperatures of about 60 to about 100° C. for a time of from about 2 to about 7 hours.

In accordance with the process of preparing a pre-formed stabilizer, an ethylenically unsaturated macromer as described above is free-radically polymerized with at least one ethylenically unsaturated monomer in the presence of at least one free-radical polymerization initiator and, optionally, a liquid diluent, and, optionally, a chain transfer agent.

With respect to the pre-formed stabilizers and to the process of making these in accordance with the present invention, it is preferred that in (a) the allophanate-modified diisocyanates are prepared from (1) a diisocyanate selected from the group consisting of diphenylmethane diisocyanate or an isomeric mixture thereof, toluene diisocyanate or an isomeric mixture thereof, and (2) an ethylenically unsaturated alcohol compound selected from the group consisting of 2-hydroxyethyl methacrylate, 2-hydroxylethyl acrylate, 2-hydroxylpropyl methacrylate, and cinnamyl alcohol.

Suitable ethylenically unsaturated monomers (B) for the preformed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred.

When using a mixture of monomers, it is preferred to use a mixture of two monomers. These monomers are typically used in weight ratios of from 80:20 (styrene:acrylonitrile) to 40:60 (S:AN), and preferably of from 75:25 (S:AN) to 50:50 (S:AN).

Suitable free-radical polymerization initiators (C) for this aspect of the present invention include, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, optionally the liquid diluent and/or the chain transfer agent.

Suitable diluents (D) for the pre-formed stabilizers of the present invention include, for example, compounds such as monools (i.e., monohydroxy alcohols), polyols, hydrocarbons, ethers etc., and mixtures thereof. Suitable mono-ols include all alcohols which contain at least one carbon atom, such as, for example, methanol, ethanol, n-propanol, isopropanol, n-butanol, sec.-butanol, tert-butanol, n-pentanol, 2-pentanol, 3-pentanol, etc. and mixtures thereof. A preferred mono-ol is isopropanol.

Suitable polyols comprise poly(oxypropylene)glycols, triols and higher functionality polyols. Such polyols include poly(oxypropylene-oxyethylene)polyols; however, desirably the oxyethylene content should comprise less than about 50% of the total and, preferably less than about 20%. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. Preferred polyols of the present invention are those which are prepared using DMC catalysis. These polyols have low unsaturation, typically 0.02 meq/g or less as measured using ASTM D2849-69. The extent of unsaturation does not affect in any adverse way the formation of the polymer polyols in accordance with the present invention.

For purposes of the present invention, useful polyols should have a number average molecular weight of about 400 or greater, the number average being used herein being the theoretical, hydroxyl number derived value. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 20 and lower, to about 280 and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where:
- OH=hydroxyl number of the polyol;
- f=functionality, that is, average number of hydroxyl groups per molecule of the polyol; and
- m.w.=molecular weight of the polyol.

The exact polyol employed depends upon the end use of the polyurethane product to be produced. The molecular weight of the hydroxyl number is selected properly to result in flexible or semi-flexible foams or elastomers when the polymer polyol produced from the polyol is converted to a polyurethane. The polyols preferably possess a hydroxyl number of from about 50 to about 150 for semi-flexible foams and from about 30 to about 70 for flexible foams. Such limits are not intended to be restrictive, but are merely illustrative of the large number of possible combinations of the above polyol coreactants.

Other types of suitable polyols for the diluent herein are known and described in U.S. Published Patent Application 20060025558, and specifically in paragraphs [0141] through [0145], the disclosure of which is hereby incorporated by reference.

Preferred polyol components to be used as diluents in the present invention typically include, for example, the alkylene oxide adducts of suitable starter materials having 4 or more hydroxyl groups such as, for example, pentaerythritol, sorbitol, diether of sorbitol, mannitol, diether of mannitol, arabitol, diether of arabitol, sucrose, oligomer of polyvinyl alcohol or glycidol, mixtures thereof, etc.

When using a mixture of a mono-ol and a polyol as the diluent for the pre-formed stabilizer, the polyol preferably comprises only a minor amount of the diluent and the mono-ol comprises a major amount. In general, the polyol will comprise less than 30 weight percent of the diluent, preferably less than about 20 weight percent, and most preferably less than about 15 weight percent. The amount of the polyol component present in the diluent is below the concentration at which gelling occurs in the pre-formed stabilizer.

Generally, the quantity of diluent is >40% by weight, based on 100% by weight of the PFS (pre-formed stabilizer).

Chain transfer agents (E) may also be present in the pre-formed stabilizers of the present invention and the process of making the pre-formed stabilizers. Suitable chain transfer agents for this aspect of the present invention include, for example, isopropanol, ethanol, tert-butanol, toluene, ethylbenzene, triethylamine, dodecylmercaptan, octadecyl-mercaptan, carbon tetrachloride, carbon tetrabromide, chloroform, methylene chloride. Chain transfer agents are also commonly referred to as molecular weight regulators. These compounds are employed in conventional amounts to control the molecular weight of the copolymerizate.

Suitable processes for preparing the pre-formed stabilizers are similar to known methods described in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. In general, the process of preparing the pre-formed stabilizer is similar to the process of preparing the polymer polyol. The temperature range is not critical and may vary from about 80 to about 150° C. or higher, and preferably from about 115 to about 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

The combination of conditions selected for the preparation of the pre-formed stabilizer should not lead to cross-linking or gel formation in the pre-formed stabilizer which can adversely affect the ultimate performance in preparing the polymer polyol composition. Combinations of too low a diluent concentration, too high a precursor and/or monomer concentration, too high a catalyst concentration, too long of a reaction time, and too much unsaturation in the precursor can result in ineffective preformed stabilizer from cross-linking or gelling.

Particularly preferred processes of preparing the pre-formed stabilizers herein are those as described in, for example, U.S. Pat. Nos. 5,196,476 and 6,013,731, the disclosures of which are hereby incorporated by reference. Preferred diluents and relative concentrations, ethylenically unsaturated monomers and relative concentrations, free-radical initiators and relative concentrations, and process conditions set forth in the references U.S. Pat. Nos. 5,196,476 and 6,013,731. Obviously, the ethylenically unsaturated macromers of the present invention differ from the macromers described by these references, thus resulting in structurally different preformed stabilizers.

The polymer polyols (i.e. stable dispersions) of the present invention comprise the free-radical polymerization product of a base polyol, the pre-formed stabilizer described above, and one or more ethylenically unsaturated monomers in the presence of at least one free-radical initiator, and optionally, a chain transfer agent, and the process for the preparation of polymer polyols (i.e. stable dispersion) comprises free-radically polymerizing these components. The resultant polymer polyols exhibit high solids contents, i.e., from 30 to 60% by weight, based on the total weight of the resultant polymer polyol. It is preferred that the solids content of the polymer polyols ranges from 40 to 50% by weight. These polymer polyols also exhibit low viscosities, i.e. from 2000 to 10,000 cSt, and preferably 4,000 to 7,000 cSt; good filterability; and are preferably white in color.

Suitable base polyols for this aspect of the present invention include, for example, base polyols such as, for example, polyether polyols. Suitable polyether polyols include those having a functionality of preferably at least about 1, and more preferably at least about 3. The functionality of suitable polyether polyols is less than or equal to about 10, preferably less than or equal to about 6, and most preferably less than or equal to about 3. The suitable polyether polyols may also have functionalities ranging between any combination of these upper and lower values, inclusive. The OH numbers of suitable polyether polyols is at least about 10, preferably at least about 20, and most preferably at least about 30. Polyether polyols typically also have OH numbers of less than or equal to about 1900, preferably less than or equal to about 800, and most preferably less than or equal to about 90. The suitable polyether polyols may also have OH numbers ranging between any combination of these upper and lower values, inclusive. The equivalent weights of suitable polyether polyols is typically greater than about 30, preferably at least about 500 and most preferably at least about 1000. The suitable polyether polyols may also have (number average) molecular weights ranging between any combination of these upper and lower values, inclusive.

These polyether polyols may also have functionalities ranging from about 1 to about 10, preferably from about 2 to about 6, and most preferably from about 2 to about 3; OH numbers ranging from about 10 to 1900, preferably from about 20 to about 800, and most preferably from about 30 to about 90; and equivalent weights ranging from greater than 30 to about 900, preferably about 100 to 2000 and most preferably about 500 to 1800.

Examples of such compounds to be used herein as polyether polyols are known and described in U.S. Published Patent Application 20060025558, and specifically in paragraphs [0158] through [0162], the disclosure of which is hereby incorporated by reference.

Suitable pre-formed stabilizers for this aspect of the present invention include those described herein above.

The ethylenically unsaturated monomers suitable for the polymer polyols of the present invention and the process of preparing these include those ethylenically unsaturated monomers described above with respect to the preparation of the pre-formed stabilizer. Other suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable to be employed in making the polymer polyol. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may is from about 80:20 to 30:70, more preferably from about 75:25 to 50:50. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols comprising the previously disclosed pre-formed stabilizer is at least about 30% by weight, based on 100% by weight of the polymer polyol. It is preferred that the solids content is from about 35 to about 70% by weight, more preferably from about 35 to less than 60% by weight, and most preferably from about 40 to about 50% by weight. Overall, the quantity of ethylenically unsaturated monomer(s) present in the polymer polyols comprising the previously disclosed ethylenically unsaturated macromers of the present invention is at least about 20% by weight, based on 100% by weight of the polymer polyol. It is preferred that the solids content is from about 20 to about 50% by weight.

Suitable free-radical initiators include those as described previously for the preparation of the pre-formed stabilizers. Among the useful initiators are those catalysts having a satisfactory half-life within the temperature ranges used in forming the stabilizer, i.e. the half-life should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroctoate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methoxylbutyronitrile), and mixtures thereof. Most preferred are the acyl peroxides described above and the azo catalysts. A particularly preferred initiator comprises azobis(isobutyronitrile).

The quantity of initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable chain transfer agents for the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Chain transfer agents are also commonly referred to as molecular weight regulators. These compounds are employed in conventional amounts to control the molecular weight of the copolymerizate.

Polymer polyols comprising the pre-formed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The various components of the polymer polyols of the present invention which comprise the free-radical polymerization product of (I) a base polyol, (II) the ethylenically unsaturated macromer disclosed herein, and (III) at least one ethylenically unsaturated monomer, in the presence of (IV) at least one free-radical polymerization initiator, and (V) a chain transfer agent, include those components described above with respect to the polymer polyols comprising the preformed stabilizers of the invention. Of course, these polymer polyols use the ethylenically unsaturated macromers described above as reactants in the preformed stabilizers and in the process of preparing the pre-formed stabilizers, to form the polymer polyols instead of the pre-formed stabilizers. The remaining components, their relative amounts and/or ratios are as described above, unless otherwise stated.

These polymer polyols comprising one or more ethylenically unsaturated macromers which correspond to those described above for the pre-formed stabilizers, are prepared by utilizing the processes as disclosed in, for example, U.S. Pat. Nos. 3,875,258, 3,931,092, 3,950,317, 3,953,393, 4,014, 846, 4,093,573, 4,372,005, 4,334,049, 4,454,255, 4,458,038, 4,689,354, 4,690,956, Re 29,014, 4,305,861, 5,093,412, 5,254,667, 6,172,164 and Re 33,291, as well as in U.S. Pat. Nos. 4,524,157, 4,539,340, Re 28,715 and Re 29,118, all of the disclosures of which are herein incorporated by reference.

In a particularly preferred embodiment of the polymer polyols comprising ethylenically unsaturated macromers, it is preferred that the ethylenically unsaturated macromers as described and claimed herein are used as ethylenically unsaturated macromers for polymer polyols and the process of making these.

The temperature range is not critical, and may vary from about 100° C. to about 140° C. or perhaps greater, the preferred range being from 115 to 125° C. As has been noted herein, the catalyst and temperature should be selected such that the catalyst has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in certain tubular reactors, e.g., in the first stages of "Marco" reactors when such reactors are operated with all the monomer added to the first stage.

The utilization of the processes as described in U.S. Pat. Nos. 5,196,476 and 6,013,731 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,916,476 and 6,013,731, the disclosures of which are hereby incorporated by reference, are essential depends on whether the process parameters are such that a satisfactory polymer polyol can be prepared without using either of these processes.

The polymer polyols of the present invention comprise dispersions in which the polymer particles (the same being either individual particles or agglomerates of individual particles) are relatively small in size and, in the preferred embodiment, are all essentially less than about one to three microns. However, when high contents of styrene are used, the particles will tend to be larger; but the resulting polymer polyols are higher useful, particularly when the end use application requires as little scorch as possible. In the preferred embodiment, essentially all of the product (i.e., about 99% or more) will pass through the filter employed in the filtration hindrance (filterability) test that will be described in conjunction with the Examples. This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50% of the product passes through the filter. Some applications may also find useful products in which only about 20% or even less passes through the filter. Accordingly, the polymer polyols of the present invention desirably contemplate the products in which only 20% pass through the filter, preferably at least 50%, and most preferably, essentially all passes through the filter.

The filtration hindrance test presents the rigorous test of polymer polyol stability, and accordingly, while satisfactory filtration hindrance characteristics are certainly to be preferred, commercially stable polymer polyols for a variety of applications may be satisfactory-defined by their viscosity and centrifugible solids level (this test being also described in connection with the Examples). Thus, polymer polyols are considered stable as long as the viscosity is no more than about 7,000 cSt at 25° C. and the centrifugible solids are less than about 10%, preferably less than 5%.

In accordance with the present invention, the stabilizer is present in an amount sufficient to insure that satisfactory stabilization will result in the desired filtration hindrance, centrifugible solids level and viscosity. In this regard, the quantity of pre-formed stabilizer generally ranges from about 1 to about 20% (preferably from about 1 to about 10%) by weight, based on the total feed. As one skilled in the art knows and understands, various factors including, for example, the free-radical initiator, the solids content, the weight ratio of S:AN, process conditions, etc., will effect the optimum quantity of pre-formed stabilizer.

Polyurethanes, preferably polyurethane foams, comprising the polymer polyols and processes for their production are also part of the present invention. Suitable polymer polyols for these polyurethanes may be either those prepared directly from ethylenically unsaturated macromers, or those prepared from pre-formed stabilizers which are based on ethylenically unsaturated macromers. These polyurethanes comprise the reaction product of a polyisocyanate component or prepolymer thereof, with an isocyanate-reactive component comprising the polymer polyols of the invention. The processes for preparing these polyurethanes comprises reacting a polyisocyanate component or prepolymer thereof, with an isocyanate-reactive component comprising the polymer polyols of the present invention.

In addition to use as stabilizers in polyether polymer polyol production, the reactive unsaturation-containing stabilizers of the subject invention may also be used for other products, for example, but not by limitation, to form impact modifiers. For example, preformed vinyl polymer impact modifiers may be prepared by reacting the reactive unsaturation-containing stabilizer with one or more polymerizable vinyl monomers such as those discussed previously, as well as multiple unsaturated monomers such as butadiene and the like. The polymerization may be affected neat, in solution in suitable solvent, or in ordinary or reverse emulsion in an aqueous system. The reactive unsaturation-containing stabilizers can also be used as a stabilizer for cement additive by copolymerizing with monomers such as acrylic acid. The stabilizers may also serve as a reactant in radiation cured coatings.

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples.

Polyol A: A glycerine-started polyether polyol produced by reacting propylene oxide and ethylene oxide in the presence of potassium hydroxide catalyst, and refining to remove the catalyst. The resultant polyol has a hydroxyl number of about 36.

Polyol B: A sorbitol-started polyether polyol produced by reacting propylene oxide and ethylene oxide in the presence of potassium hydroxide catalyst, and refining to remove the catalyst. The resultant polyol has a hydroxyl number of about 28.

Polyol C: A glycerine-started polyether polyol produced by reacting propylene oxide and ethylene oxide in the presence of potassium hydroxide catalyst, and refining to remove the catalyst. The resultant polyol has a hydroxyl number of about 52.

HEMA: 2-hydroxyethyl methacrylate, an ethylenically unsaturated alcohol

Isocyanate A: Diphenylmethane 4,4'-diisocyanate (MDI), commercially available from Bayer MaterialScience.

BQ: 1,4-Benzoquinone

ZnAcAc: Zinc acetylacetonate

Initiator A: tert-butyl peroxide (TBPO)

Initiator B: Azobis(isobutyronitrile), commercially available as VAZO 64 from DuPont.

Viscosity: Viscosities were measured using a Cannon-Fenske viscometer.

Filtration Filterability is determined by diluting one part by weight

Hindrance sample (e.g. 200 grams) of polymer polyol with two parts (Filterability): by weight anhydrous isopropanol (e.g. 400 grams) to remove any viscosity-imposed limitations and using a fixed quantity of material in relative to a fixed cross-sectional area of screen (e.g. 1⅛ in. diameter), such that all of the polymer polyol and isopropanol solutions passes by gravity through a 150-mesh screen. The 150-mesh screen has a square mesh with average mesh opening of 105 microns and it is a "Standard Tyler" 150 square-mesh screen. The amount of sample which passes through the screen within 1200 seconds is reported in percent, a value of 100 percent indicates that over 99 weight percent passes through the screen.

Example 1

Allophanate-Modified Isocyanate which Contained Reactive Unsaturation

HEMA (480 g) was added to a mixture of Isocyanate A (3000 g) and 1,4-benzoquinone (2.4 g) at 60° C. under nitrogen. The solution was heated at 60° C. for 75 minutes. Then, Zn AcAc (0.5 g) was added and the reaction solution was heated at 90° C. for 75 minutes. After cooling to 60° C., benzoyl chloride (1.0 g) was added to give a storage stable yellow liquid which had an NCO group content of about 20.0%.

Example 2

Macromer A

Polyol A (3500 g) and BQ (1.8 g) were added to a 5 L flask under nitrogen. The allophanate-modified isocyanate from Example 1 (157 g) was added via addition funnel, keeping the temperature below 70° C. The mixture was stirred for 2 hours at 70° C. to give a light yellow product which had an OH number of about 26.7.

Example 3

Macromer B

Polyol B (3500 g) and BQ (1.1 g) were added to a 5 L flask under nitrogen. The allophanate-modified isocyanate from Example 1 (94 g) was added via addition funnel, keeping the temperature below 70° C. The mixture was stirred for 2 hours at 70° C. to give a light yellow product which had an OH number of about 21.7.

Pre-Formed Stabilizer (PFS) Formulations:

This is a general process for the preparation of pre-formed stabilizers (PFS) made from Macromers A and B to give PFS A and B, respectively. Each of the pre-formed stabilizers was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±1° C. The product from the second-stage reactor overflowed continuously through a pressure regulator designed to control the pressure in each stage at 65 psig. The pre-formed stabilizer then passed through a cooler and into a collection vessel. The formulations used for the pre-formed stabilizer are listed in Table 1.

TABLE 1

Pre-formed Stabilizer Formulation

| | Pre-formed Stabilizers | |
|---|---|---|
| | PFS A | PFS B |
| Diluent type | isopropanol | Isopropanol |
| Diluent concentration in feed, wt-% | 60.0 | 60.0 |
| Macromer A concentration in feed, wt-% | 24.0 | |
| Macromer B concentration in feed, wt-% | | 24.0 |
| Monomers concentration in feed, wt-% | 15.9 | 15.9 |
| Styrene/acrylonitrile ratio in feed, wt-% | 50/50 | 50/50 |
| Initiator A concentration, wt-% | 0.1 | 0.1 |

Polymer Polyol (PMPO) Formulations:

This series of examples relates to the preparation of polymer polyols made from pre-formed stabilizers A and B, respectively. Each of the polymer polyols was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±1° C. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The wt-% total polymer in the product was calculated from the concentrations of monomers measured in the crude polymer polyol before stripping. The parameters used in the experiments are listed in Table 2.

TABLE 2

| | Example | | | |
|---|---|---|---|---|
| | 4 | 5 | 6 | 7 |
| Preparation Conditions: | | | | |
| Initiator B in feed, wt % | 0.32 | 0.32 | 0.32 | 0.32 |
| Base polyol | A | A | A | C |
| Base polyol in feed, wt % | 52 | 52 | 51 | 45 |
| Pre-formed stabilizer | A | B | B | B |
| Macromer | A | B | B | B |
| Macromer in feed, wt % | 1.7 | 1.7 | 2.0 | 2.0 |
| Isopropanol in feed, wt % | 4.7 | 4.7 | 5.0 | 5.0 |
| Monomers in feed, wt % | 40 | 40 | 40 | 47 |
| 150-Mesh filtration, % | 100 | 100 | 100 | 100 |
| Product Properties: | | | | |
| Total polymer (stripped product), wt % | 43 | 43 | 43 | 49 |
| Viscosity, cSt | 5294 | 4924 | 4904 | 5406 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated macromer which comprises the reaction product of:
   (a) an allophanate-modified diisocyanate having an NCO group content of about 9% to about 48% which contains ethylenic unsaturation and comprises the reaction product of:
      (1) a diisocyanate, and
      (2) at least one ethylenically unsaturated alcohol compound, in the presence of
      (3) at least one radical inhibitor which is free of NCO-reactive groups, and
      (4) at least one allophanate catalyst; with
   (b) a polyether polyol having an OH number of 10 to 300 and a functionality of 2 to 15, optionally, in the presence of
   (c) one or more urethane catalysts.

2. The ethylenically unsaturated macromer of claim 1, wherein (a)(1) said diisocyanate is selected from the group consisting of diphenylmethane diisocyanate, toluenediisocyanate, hexamethylene diisocyanate, isophorone diisocyanate, methylenedicyclohexane diisocyanate and tetramethylxylene diisocyanate.

3. The ethylenically unsaturated macromer of claim 2, wherein (a)(1) said diisocyanate comprises diphenylmethane diisocyanate which comprises (i) from 0% to 6% by weight of the 2,2'-isomer, from 0% to 76% by weight of the 2,4'-isomer and from 24% to 100% by weight of the 4,4'-isomer with the sum of the %'s by weight of (i), (ii) and (iii) totaling 100% by weight of (a)(1) said diphenylmethane diisocyanate.

4. The ethylenically unsaturated macromer of claim 1, wherein (a)(2) said ethylenically unsaturated alcohol is selected from the group consisting of hydroxyalkyl acrylates, hydroxylalkyl methacrylates, hydroxylaryl acrylates, hydroxyaryl methacrylates, aromatic-substituted ethylenically unsaturated monols, isopropenylphenyl monols, hydroxyl nitriles and mixtures thereof.

5. The ethylenically unsaturated macromer of claim 4, wherein (a)(2) said ethylenically unsaturated alcohol comprises 2-hydroxyethyl methacrylate.

6. The ethylenically unsaturated macromer of claim 1, wherein (b) said polyether polyol has a functionality of from about 3 to about 10, an OH number of from about 15 to about 200, and a molecular weight of from about 2,000 to about 12,000.

7. The ethylenically unsaturated macromer of claim 1, wherein (a)(2) said ethylenically unsaturated alcohol compound has a molecular weight in the range of from 69 to 1500.

8. A preformed stabilizer comprising the free-radical polymerization product of:
   (A) the ethylenically unsaturated macromer of claim 1, with
   (B) at least one ethylenically unsaturated monomer, in the presence of
   (C) at least one free-radical polymerization initiator, and, optionally,
   (D) a liquid diluent, and, optionally,
   (E) a chain transfer agent.

9. The preformed stabilizer of claim 8, wherein (A) the ethylenically unsaturated macromer comprises the reaction product of:
   (a) an allophanate-modified diisocyanate having an NCO group content of about 9.5% to about 32.3%, which contains ethylenic unsaturation and comprises the reaction product of:
      (1) diphenylmethane diisocyanate which comprises
         (i) from 0 to 6% by weight of the 2,2'-isomer,
         (ii) from 0 to 76% by weight of the 2,4'-isomer, and
         (iii) from 24 to 100% by weight of the 4,4'-isomer, with the sum of (i), (ii) and (iii) totaling 100% by weight of the diphenylmethane diisocyanate; and
      (2) an ethylenically unsaturated alcohol selected from the group consisting of hydroxyalkyl acrylates, hydroxylalkyl methacrylates, hydroxylaryl acrylates, hydroxyaryl methacrylates, aromatic-substituted ethylenically unsaturated monols, isopropenylphenyl monols, hydroxyl nitriles and mixtures thereof; and
   (b) a polyether polyol having a functionality of from about 3 to about 10, an OH number of about 15 to about 200 and a molecular weight of from about 2,000 to about 12,000.

10. The preformed stabilizer of claim 8, wherein (B) said ethylenically unsaturated monomer is selected from the group consisting of acrylonitrile, styrene and mixtures thereof.

11. The preformed stabilizer of claim 10, wherein (B) comprises a mixture of styrene and acrylonitrile in a weight ratio of 80:20 to 40:60.

12. The preformed stabilizer of claim 8, wherein (C) said free-radical initiator is selected from the group consisting of one or more peroxide initiators, one or more azo initiators and mixtures thereof.

13. The preformed stabilizer of claim 8, wherein (D) said diluent is selected from the group consisting of a mono-ol, a polyol, a hydrocarbon, an ether and mixtures thereof.

14. The preformed stabilizer of claim 8, wherein (E) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabromide, chloroform, and methylene chloride.

15. A polymer polyol comprising the reaction product of:
(I) a base polyol having a hydroxyl number of from about 10 to about 1900, a functionality of about 1 to about 10, and an equivalent weight of about 30 to about 2500,
(II) the preformed stabilizer of claim 8, and
(III) at least one ethylenically unsaturated monomer, in the presence of
(IV) at least one free-radical polymerization initiator, and, optionally,
(V) a chain transfer agent.

16. The polymer polyol of claim 15, wherein (III) said ethylenically unsaturated monomer is selected from the group consisting of styrene, acrylonitrile and mixtures thereof.

17. The polymer polyol of claim 15, wherein (III) said ethylenically unsaturated monomer comprises a mixture of styrene and acrylonitrile in a weight ratio of 80:20 to 30:70.

18. The polymer polyol of claim 15, wherein (IV) said free-radical polymerization initiator is selected from the group consisting of acyl peroxides, alkyl peroxides, azo compounds and mixtures thereof.

19. The polymer polyol of claim 15, wherein (V) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabromide, chloroform and methylene chloride.

20. A polymer polyol comprising the reaction product of:
(I) a base polyol having a hydroxyl number of from about 10 to about 1900, a functionality of about 1 to about 10
(II) the ethylenically unsaturated macromer of claim 1, and
(III) at least one ethylenically unsaturated monomer, in the presence of:
(IV) at least one free-radical polymerization initiator, and, optionally,
(V) a chain transfer agent.

21. The polymer polyol of claim 20, wherein (III) said ethylenically unsaturated monomer is selected from the group consisting of styrene, acrylonitrile and mixtures thereof.

22. The polymer polyol of claim 20, wherein (III) said ethylenically unsaturated monomer comprises a mixture of styrene and acrylonitrile in a weight ratio of 80:20 to 30:70.

23. The polymer polyol of claim 20, wherein (IV) said free-radical polymerization initiator is selected from the group consisting of acyl peroxides, alkyl peroxides, azo compounds and mixtures thereof.

24. The polymer polyol of claim 20, wherein (V) said chain transfer agent is selected from the group consisting of isopropanol, ethanol, tert-butanol, toluene, ethylbenzene, triethylamine, dodecylmercaptan, octadecylmercaptan, carbon tetrachloride, carbon tetrabromid, chloroform and methylene chloride.

* * * * *